US010263998B1

(12) United States Patent
Bhatt et al.

(10) Patent No.: US 10,263,998 B1
(45) Date of Patent: Apr. 16, 2019

(54) AUTOMATED DETERMINATION OF RELEVANCE OF A SECURITY ALERT TO ONE OR MORE OTHER SECURITY ALERTS BASED ON SHARED MARKERS

(71) Applicant: EMC IP Holding Company LLC, Hopkinton, MA (US)

(72) Inventors: Nitin Bhatt, San Ramon, CA (US); Vadim Bruk, San Foster City, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 232 days.

(21) Appl. No.: 15/378,336

(22) Filed: Dec. 14, 2016

(51) Int. Cl.
H04L 29/06 (2006.01)
G06N 7/00 (2006.01)

(52) U.S. Cl.
CPC ............. H04L 63/14 (2013.01); G06N 7/00 (2013.01); H04L 63/20 (2013.01)

(58) Field of Classification Search
CPC . H04L 63/14; H04L 63/1408; H04L 63/1425; H04L 63/1441; H04L 63/20
See application file for complete search history.

(56) References Cited

U.S. PATENT DOCUMENTS 7,624,448 B2 * 11/2009 Coffman ............... G06F 21/552
726/22
9,325,733 B1 4/2016 Kolman et al.
2003/0041264 A1 2/2003 Black et al.
2004/0260945 A1 12/2004 Raikar et al.
2010/0115617 A1 5/2010 Weber et al.
2010/0263049 A1 10/2010 Cross et al.
2015/0081885 A1 * 3/2015 Thomas ............... G06F 9/45558
709/224
2015/0264077 A1 * 9/2015 Berger ................... G06F 21/554
726/23

OTHER PUBLICATIONS

Wikipedia, "Security Information and Event Management," https://en.wikipedia.org/wiki/Security_information_and_event_management, Oct. 15, 2016, 2 pages.
Wikipedia, "Security Operations Center," https://en.wikipedia.org/wiki/Security_operations_center, Oct. 15, 2016, 2 pages.

* cited by examiner

Primary Examiner — Kambiz Zand
Assistant Examiner — Tongoc Tran
(74) Attorney, Agent, or Firm — Ryan, Mason & Lewis, LLP (57) ABSTRACT

A processing device in one embodiment comprises a processor coupled to a memory and is configured to obtain a plurality of security alerts in a computer network, to process the security alerts to extract a plurality of markers from each of the security alerts, to compute at least one relevance score relating a given one of the security alerts to another one of the security alerts based at least in part on distance measures computed between markers shared by the given security alert and the other security alert, and to adjust at least one operating characteristic of a network security system of the computer network based at least in part on the relevance score. The relevance score may be computed as a function of a number of markers shared by the given security alert and the other security alert.

20 Claims, 2 Drawing Sheets

AUTOMATED DETERMINATION OF RELEVANCE OF A SECURITY ALERT TO ONE OR MORE OTHER SECURITY ALERTS BASED ON SHARED MARKERS

FIELD

The field relates generally to computer networks, and more particularly to techniques for providing security in a computer network.

BACKGROUND

Computer networks are often configured to incorporate network security systems in order to protect the networks against malicious activity. Such malicious activity can include, for example, fraudulent access attempts made by human users or possibly by networks of compromised computers or "botnets."

Network security systems can be designed to protect a computer network of a company, organization or other large enterprise comprising many thousands of user devices. However, enterprise computer networks are in many cases continuously growing in size, and often incorporate a diverse array of user devices, including mobile telephones, laptop computers and tablet computers. This continuous growth can make it increasingly difficult to provide a desired level of protection using the limited resources of the network security system. For example, available network security system functionality such as processing of security alerts and deployment of attack remediation measures on user devices can be strained by the demands of large enterprise networks.

Moreover, recent years have seen the rise of increasingly sophisticated attacks including advanced persistent threats (APTs) which can pose severe risks to enterprises. These APTs are typically orchestrated by well-funded attackers using advanced tools to adapt to the victim environment while maintaining low profiles of activity. As a result, conventional credential-based authentication techniques and other traditional defenses typically deployed by enterprise network security systems today often fail at detecting and remediating access anomalies at a sufficiently early stage.

SUMMARY

Illustrative embodiments provide techniques for automated determination of relevance of a given security alert to one or more other security alerts based on shared markers. For example, some embodiments are configured to generate a plurality of relevance scores each relating the given security alert to a different one of a plurality of other ones of the security alerts. Some of the relevance scores may relate the given security alert to respective other security alerts that were generated prior in time to the given security alert, while other ones of the relevance scores may relate the given security alert to respective other security alerts that were generated subsequent in time to the given security alert. These and other arrangements disclosed herein can advantageously provide enhanced security against APTs and other types of attacks in enterprise computer networks.

In one embodiment, a processing device comprises a processor coupled to a memory and is configured to obtain a plurality of security alerts in a computer network, to process the security alerts to extract a plurality of markers from each of the security alerts, to compute at least one relevance score relating a given one of the security alerts to another one of the security alerts based at least in part on distance measures computed between markers shared by the given security alert and the other security alert, and to adjust at least one operating characteristic of a network security system of the computer network based at least in part on the relevance score.

By way of example, the relevance score may be computed in some embodiments as a function of a number of markers shared by the given security alert and the other security alert. In a more particular example of such an arrangement, the relevance score may be configured to increase with an increasing number of markers shared by the given security alert and the other security alert.

In some embodiments, adjusting at least one operating characteristic of the network security system may comprise altering a visualization generated by the network security system to provide an indication of a threshold level of relevance between the given security alert and the other security alert. Numerous other types of adjustments in one or more operating characteristics of the network security system may be implemented based at least in part on computed relevance scores.

Some embodiments are configured to utilize different functions to compute distance measures between markers of different types. For example, a distance measure computed between markers comprising IP addresses of user devices of the computer network may be computed at least in part utilizing a function that measures distance between subnets of the IP addresses, while a distance measure computed between markers comprising user identifiers of user devices of the computer network may be computed at least in part utilizing a function that measures distance between associated organizations of the user identifiers. Numerous other combinations of different functions can be used in other embodiments for computing distance measures for different types of markers.

One or more illustrative embodiments implement map-reduce processing to compute a plurality of relevance scores relating the given security alert to respective other security alerts. For example, a map function of the map-reduce processing may execute on a subset of the security alerts falling within a predefined time range encompassing the given security alert and determine for each of the security alerts in the subset a corresponding maximum match count of markers shared with the given security alert. A reduce function of the map-reduce processing may output respective identifiers of the security alerts of the subset in association with their respective maximum match counts.

The automated determination of relevance of a given security alert to one or more other security alerts based on shared markers in illustrative embodiments can advantageously avoid the excessive costs and inaccuracies that would otherwise be associated with conventional security agent processing of security alerts generated at different points in time. Accordingly, illustrative embodiments are better able to detect malicious activity associated with APTs or other types of sophisticated attacks in a computer network.

A given processing device configured with functionality for automated determination of relevance of a given security alert to one or more other security alerts based on shared markers may be implemented, for example, in one or more network devices of a computer network, or in a security analytics system or other type of network security system associated with the computer network.

These and other illustrative embodiments disclosed herein include, without limitation, methods, apparatus, networks,

DETAILED DESCRIPTION

Illustrative embodiments of the present invention will be described herein with reference to exemplary computer networks and associated computers, servers, network devices or other types of processing devices. It is to be appreciated, however, that the invention is not restricted to use with the particular illustrative network and device configurations shown. Accordingly, the term "computer network" as used herein is intended to be broadly construed, so as to encompass, for example, any system comprising multiple networked processing devices.

Figure 1:
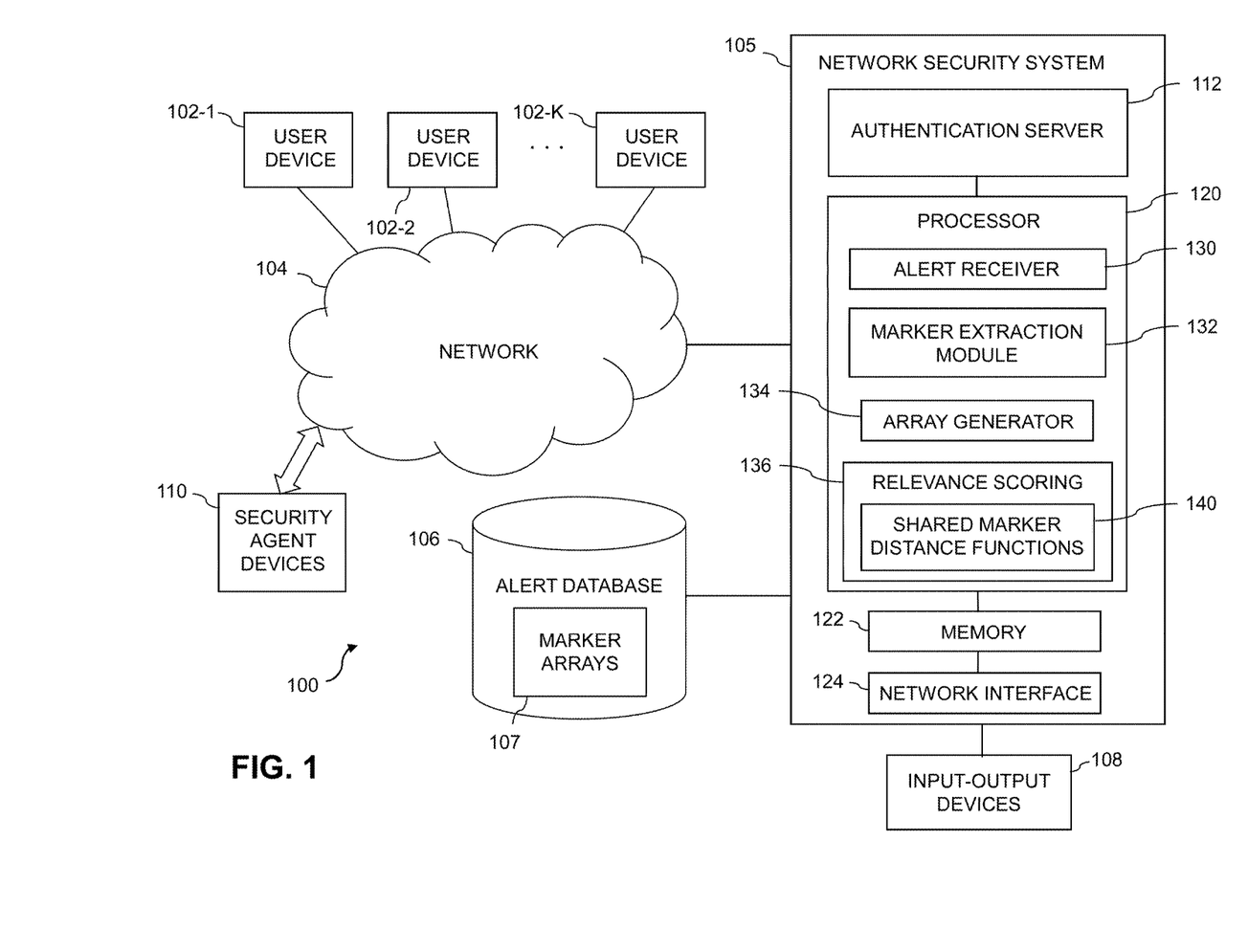
FIG. 1 is a block diagram of a computer network configured for automated determination of relevance of a given security alert to one or more other security alerts based on shared markers in an illustrative embodiment.

FIG. 1 shows a computer network 100 configured in accordance with an illustrative embodiment of the invention. The computer network 100 comprises a plurality of user devices 102-1, 102-2, . . . 102-K, collectively referred to herein as user devices 102. The user devices 102 are coupled to a network 104, where the network 104 in this embodiment is assumed to represent a sub-network or other related portion of the larger computer network 100. Accordingly, elements 100 and 104 are both referred to herein as examples of "networks" but the latter is assumed to be a component of the former in the context of the FIG. 1 embodiment. Also coupled to the network 104 is a network security system 105.

The user devices 102 may comprise, for example, mobile telephones, laptop computers, tablet computers, desktop computers or other types of devices capable of communicating over the network 104, in any combination. Such devices are examples of what are more generally referred to herein as "processing devices." Some of these processing devices are also generally referred to herein as "computers."

The user devices 102 in some embodiments comprise respective computers associated with a particular company, organization or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a WiFi or WiMAX network, or various portions or combinations of these and other types of networks. The computer network 100 in some embodiments therefore comprises combinations of multiple different types of networks each comprising processing devices configured to communicate using IP or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniB and, Gigabit Ethernet or Fibre Channel. Numerous alternative networking arrangements are possible in a given embodiment, as will be appreciated by those skilled in the art.

The network security system 105 has an associated alert database 106 configured to store information relating to security alerts generated in the computer network 100. The stored information illustratively comprises marker arrays 107 which include markers and other related information extracted from the security alerts. For example, a given one of the marker arrays 107 can include one or more sets of markers having a specified relationship for one or more events of a corresponding security alert. One or more marker arrays 107 can be stored in the alert database 106 for each of a plurality of security alerts processed by the network security system 105.

Other types of information that can be stored in the alert database 106 as part of or in conjunction with the marker arrays 107 include network sessions data, login data or other types of data characterizing user access to protected resources within the computer network 100, as well as various combinations of multiple distinct types of such data. Network sessions data can include, for example, virtual private network (VPN) session data for VPN connections initiated within the computer network 100. Login data can include, for example, authentication data or other types of login data including timestamps and other information associated with login events. Numerous other types of information can be incorporated into the marker arrays 107 or otherwise stored in the alert database 106.

The alert database 106 in the present embodiment is illustratively implemented as part of one or more storage systems coupled to or otherwise associated with the network security system 105. Such storage systems can comprise any of a variety of different types of storage including network-attached storage (NAS), storage area networks (SANs), direct-attached storage (DAS) and distributed DAS, as well as combinations of these and other storage types, including software-defined storage.

Other examples of particular types of storage that can be used in implementing a given storage system in an illustrative embodiment include storage arrays, flash storage, cloud storage, object-based storage, and scale-out NAS clusters. Combinations of multiple ones of these and other storage types can also be used in implementing a given storage system in an illustrative embodiment.

Although shown as being arranged externally to the network security system 105, the alert database 106 in some embodiments can be at least in part internal to the network security system 105. For example, at least portions of the alert database 106 can be implemented as an in-memory database utilizing the memory 122.

Also associated with the network security system 105 are input-output devices 108, which illustratively comprise keyboards, displays or other types of input-output devices in any combination. Such input-output devices are used to support one or more user interfaces to the network security system 105, as well as to support communication between the network security system 105 and other related systems and devices not explicitly shown.

In the present embodiment, the network security system 105 is configured to communicate over the network 104 with a plurality of security agent devices 110. Such devices, like the user devices 102, can illustratively comprise mobile telephones, laptop computers, tablet computers, desktop computers, or other types of computers or processing devices configured for communication over network 104 with the network security system 105. For example, a given security agent device can comprise a mobile telephone equipped with a mobile application configured to receive alerts from the network security system 105 and to provide an interface for a security agent to select particular remedial measures for responding to the alerts. Examples of such remedial measures may include logging off the user device in question, or requiring various additional authentication factors for subsequent access attempts made from the user device in question.

It should be noted that a "security agent" as the term is generally used herein may comprise, for example, an automated entity, such as a hardware, software or firmware entity running on a processing device. Accordingly, like the above-noted "user," a security agent may but need not comprise a human entity.

The network security system 105 comprises an authentication server 112. Login events initiated at respective ones of the user devices 102 are directed to the authentication server 112 over the network 104 for processing. The authentication server 112 determines if a given access attempt is authentic based on presentation of one or more predetermined authentication factors such as user identifiers, passwords or other factors. Upon verification of the presented authentication factors, the authentication server 112 grants the requesting user device 102 access to one or more protected resources of the computer network 100. Although shown as an element of the network security system 105 in this embodiment, the authentication server 112 in other embodiments can be implemented at least in part externally to the network security system 105, for example, as a stand-alone server, set of servers or other type of authentication system coupled to the network 104.

The network security system 105 in the FIG. 1 embodiment is assumed to be implemented using at least one processing device. Each such processing device generally comprises at least one processor and an associated memory, and implements one or more functional modules for controlling certain features of the network security system 105.

More particularly, the network security system 105 in this embodiment comprises a processor 120 coupled to a memory 122 and a network interface 124.

The processor 120 illustratively comprises a microprocessor, a microcontroller, an application-specific integrated circuit (ASIC), a field-programmable gate array (FPGA) or other type of processing circuitry, as well as portions or combinations of such circuitry elements.

The memory 122 illustratively comprises random access memory (RAM), read-only memory (ROM) or other types of memory, in any combination. The memory 122 and other memories disclosed herein may be viewed as examples of what are more generally referred to as "processor-readable storage media" storing executable computer program code or other types of software programs.

Articles of manufacture comprising such processor-readable storage media are considered embodiments of the present invention. A given such article of manufacture may comprise, for example, a storage device such as a storage disk, a storage array or an integrated circuit containing memory, as well as a wide variety of other types of computer program products. The term "article of manufacture" as used herein should be understood to exclude transitory, propagating signals.

The network interface 124 allows the network security system 105 to communicate over the network 104 with the user devices 102 and the security agent devices 110, and illustratively comprises one or more conventional transceivers.

The processor 120 further comprises an alert receiver 130, a marker extraction module 132, an array generator 134 and a relevance scoring module 136. The relevance scoring module 136 utilizes shared marker distance functions 140.

The alert receiver 130 is configured to obtain a plurality of security alerts generated in the computer network 100. For example, at least a subset of the security alerts may comprise security alerts that are received in the network security system 105 from one or more of the user devices 102 of the computer network 100. The security alerts can additionally or alternatively include security alerts that are generated internally to the network security system 105, utilizing an alert generator that is not explicitly shown in the figure.

Accordingly, the security alerts received by the alert receiver 130 illustratively include a combination of security alerts received over the network 104 and security alerts generated internally to the network security system 105. These and other security alerts are obtained by the alert receiver 130 and then subject to further processing to generate relevance scores as will be described in more detail below.

The marker extraction module 132 is configured to extract a plurality of markers from each of the security alerts. Examples of markers that may be used in illustrative embodiments include a user name or other type of user identifier, a source IP address, a source domain, a destination IP address and a destination domain, although it is to be appreciated that numerous additional or alternative markers can be used in other embodiments. For example, other types of markers that may be used in some embodiments include a host machine identifier and a file hash. The file hash is illustratively a hash of an uploaded file.

The array generator 134 processes the extracted markers from marker extraction module 132 so as to arrange the markers and possibly additional related information into marker arrays 107 for storage in the alert database 106.

The relevance scoring module 136 utilizes the marker arrays 107 stored in the alert database 106 to compute relevance scores for respective ones of the security alerts. For example, the relevance scoring module 136 can compute at least one relevance score relating a given one of the security alerts to another one of the security alerts based at least in part on distance measures computed between markers shared by the given security alert and the other security alert as reflected in their respective marker arrays. The distance measures are computed using the shared marker distance functions 140.

The relevance scoring module 136 in some embodiments is configured to generate a plurality of relevance scores each relating the given security alert to a different one of a plurality of other ones of the security alerts. For example, a first one of the relevance scores may relate the given security alert to another security alert that was generated prior in time to the given security alert, and a second one of the relevance scores may relate the given security alert to another security alert that was generated subsequent in time to the given security alert. Additional relevance scores similarly indicate respective degrees of relevance to the given security alert of other security alerts prior or subsequent in time to the given security alert.

The relevance score may be computed for a given security alert in some embodiments as a function of a number of markers shared by the given security alert and the other security alert such that the relevance score increases with an increasing number of markers shared by the given security alert and the other security alert. The number of shared markers is an example of one type of a "distance measure" as that term is broadly used herein.

The shared marker distance functions 140 utilized in the relevance scoring module 136 can include different functions that are utilized to compute distance measures between markers of different types.

For example, a distance measure computed between markers comprising IP addresses of user devices of the computer network may be computed at least in part utilizing a function that measures distance between subnets of the IP addresses. In such an arrangement, the distance between two IP addresses belonging to the same subnet will be less than the distance between two IP addresses not belonging to the same subnet. If two markers present the same IP address then the distance between those two markers will be zero.

As another example, a distance measure computed between markers comprising user identifiers of user devices of the computer network may be computed at least in part utilizing a function that measures distance between associated organizations of the user identifiers. In such an arrangement, the distance between two user identifiers of respective users in the same organization will be less than the distance between two user identifiers of respective users in different organizations.

The different marker types are illustratively defined based on their respective semantics, although other defining characteristics may be used. Each marker type having distinct semantics may have a corresponding distinct distance function.

The relevance scores provide an accurate and efficient mechanism to automatically inform security agents of additional relevant security alerts relating to a particular received security alert. The additional relevant security alerts may have been generated prior to or subsequent to the time that the particular received security alert was generated. By relating such security alerts to one another based at least in part on relevance score, security agents of the computer network 100 can be provided with more detailed information about particular types of malicious activity and associated exploit patterns.

Illustrative embodiments can be configured to provide a wide variety of different types of security alert aggregation, each involving the designation of a threshold relationship that at least one security alert has to one or more other security alerts. For example, one set of multiple security alerts can be designated as related to another set of multiple security alerts based at least in part on relevance scores.

In the FIG. 1 embodiment, at least one operating characteristic of the network security system 105 is adjusted based at least in part on the relevance scores computed by the relevance scoring module 136. By way of example, a visualization generated by the network security system 105 may be altered to provide an indication of a threshold level of relevance between a given security alert and one or more other security alert based at least in part on values of the corresponding relevance scores. Such a visualization may be provided to one or more of the security agent devices 110 over the network 104 or provided to an external device or system via the input-output devices 108. Additionally or alternatively, a given one of the input-output devices 108 may comprise a monitor or other display device providing a user interface that includes the visualization.

Other examples of possible adjustments in one or more operating characteristics of the network security system 105 that may be made responsive to particular relevance scores include the generation of additional relevance-based security alerts that are distributed over the network 104 to the security agent devices 110. More particularly, a determination that a current security alert has a high degree of relevance to a previous security alert deemed to be associated with malicious activity can lead to generation of an additional relevance-based security alert that brings the high degree of relevance to the attention of a security agent. This can involve comparing the relevance score to one or more predetermined thresholds such as an alerting threshold corresponding to a degree of relevance deemed sufficiently high to justify generation of further security alerts.

Accordingly, the network security system 105 can be configured to compare the relevance scores to a threshold and to generate additional security alerts for any of the relevance scores that exceed the threshold. A given such additional security alert can specify the given security alert as well as the other security alerts to which it has been determined to have a sufficiently high degree of relevance. As mentioned previously, the network security system 105 can include an alert generator configured to generate such security alerts, although the alert generator is not explicitly shown in the figure. Such additional security alerts can themselves be processed through the modules 130, 132, 134 and 136 to generate additional relevance scores. In other embodiments, multiple alerts of different types can be generated relating to a given security alert being processed in the network security system 105.

Additional description regarding more detailed examples of relevance score generation techniques and associated distance functions that are used in illustrative embodiments will be provided below.

The arrangement described above advantageously permits the network security system 105 to automatically determine the relevance of a given security alert to one or more prior or subsequent security alerts. Accordingly, the limited resources of the network security system 105 available for attack detection and remediation can be more intelligently and effectively deployed in the computer network 100, resulting in improved performance as well as enhanced security against APTs and other types of attacks.

It is to be appreciated that this particular arrangement of modules 130, 132, 134 and 136 illustrated in the processor 120 of the FIG. 1 embodiment is presented by way of example only, and alternative arrangements can be used in other embodiments. For example, the functionality associated with the modules 130, 132, 134 and 136 in other embodiments can be combined into a single module, or separated across a larger number of modules. As another example, multiple distinct processors can be used to implement different ones of the modules 130, 132, 134 and 136 or portions thereof.

At least portions of the alert receiver 130, marker extraction module 132, array generator 134 and relevance scoring module 136 may be implemented at least in part in the form of software that is stored in memory 122 and executed by processor 120. Similarly, at least portions of the authentication server 112 of the network security system 105 can be implemented at least in part in the form of software that is stored in memory 122 and executed by processor 120.

It should also be understood that the particular set of elements shown in FIG. 1 for automatically determining relevance of a given security alert to one or more other security alerts in computer network 100 is presented by way of illustrative example only, and in other embodiments additional or alternative elements may be used. Thus, another embodiment may include additional or alternative systems, devices and other network entities, as well as different arrangements of modules and other components.

By way of example, in other embodiments, one or more components of the network security system 105, such as authentication server 112, alert receiver 130, marker extraction module 132, array generator 134 and relevance scoring module 136, can be implemented elsewhere in the computer network 100.

In some embodiments, the network security system 105 is a part of or otherwise associated with another system, such as, for example, a security operations center (SOC) or a critical incident response center (CIRC).

Additionally or alternatively, the network security system 105 can be part of or incorporate an otherwise conventional security analytics system, such as the RSA Security Analytics system commercially available from RSA, The Security Division of EMC Corporation of Hopkinton, Mass.

Other embodiments can implement the network security system 105 and its associated authentication server 112 as part of or in conjunction with a security information and event management (SIEM) system, such as the enVision® platform, also commercially available from RSA. Such an SIEM system is also considered another possible example of a "network security system" as that term is broadly used herein. In an embodiment of this type, at least portions of the marker arrays 107 stored in the alert database 106 may comprise additional information derived from security logs collected by the SIEM system.

An exemplary process utilizing alert receiver 130, marker extraction module 132, array generator 134 and relevance scoring module 136 of the network security system 105 in computer network 100 will now be described in more detail with reference to the flow diagram of FIG. 2. It is to be understood that this particular process is only an example, and additional or alternative processes can be carried out in other embodiments.

In this embodiment, the process includes steps 200 through 210. These steps are assumed to be performed by the processor 120 utilizing its modules 130, 132, 134 and 136, but in other embodiments can be performed using other types of computer networks, network security systems and associated processing devices.

In step 200, security alerts are received in a computer network. A given such security alert generally indicates the occurrence of an event or a sequence of events that are potentially out of the ordinary. For example, in the context of the FIG. 1 embodiment, security alerts may be received by the alert receiver 130 from one or more of the user devices 102 over the network 104. This may include security alerts received from software applications, hardware components and other network entities. Additionally or alternatively, security alerts may be received from an alert generator implemented in the network security system 105. Combinations of different types of security alerts from a wide variety of different sources may be received in this step. The security alerts may include batches of security alerts aggregated over a particular time period as well as real-time or near-real-time security alerts that are received as they are generated.

In step 202, the received security alerts are processed to extract multiple markers associated with one or more events from each of the security alerts. For example, this can illustratively involve identifying at least one relationship set of markers having a specified relationship for one or more events of a given security alert being processed, forming a marker array comprising the relationship set of markers having the specified relationship for the one or more events, and storing the marker array for the given security alert as one of the marker arrays 107 in the alert database 106 associated with the network security system 105. Other instances of the marker arrays 107 can be generated and stored for other security alerts in a similar manner.

The one or more events of the given security alert illustratively comprise respective occurrences of at least one of an activity and a change of state relating to at least one of the user devices 102 of the computer network 100. Other types of events may be characterized by security alerts in other embodiments. Each such event of a given security alert is assumed to comprise a set of markers.

By way of example, a given one of the marker arrays 107 for the given security alert may include the following relationship set of markers relating to two distinct events:

[Marker1→Marker2→Marker3→Marker4] {From event 1}

[Marker1→Marker2→Marker3→Marker4] {From event 2}

As a more particular example, the relationship set of markers may be arranged in the following manner:

["A", "B", "C", "D"] {Marker values from event 1}
["R", "D", "C", "B"] {Marker values from event 2}

Again, the above relationship sets of markers are examples only, and numerous other arrangements may be used in other embodiments.

In step 204, relevance scores relating a given one of the security alerts to respective other ones of the security alerts are computed. The relevance scores are more particularly computed based at least in part on distance measures computed between markers shared by the given security alert and the other security alerts.

For example, a relevance score can be computed for the given security alert in accordance with the following equation:

$$Rel = \sum_{k=0}^{n} \omega_k \cdot (1 - \Delta_k)$$

where Rel denotes the relevance score, $\omega_k$ denotes a weight coefficient for a k-th marker of a relationship set, $\Delta_k$ denotes a distance measure computed between corresponding k-th markers shared by the given security alert and the other security alert, and n denotes a total number of markers in the relationship set that includes the k-th marker.

The weights used in the above computation are illustratively static weights, although other types of weights can be used. Such weights can be assigned by a security agent based on the particular markers of interest within a given implementation. Additionally or alternatively, the weights can be automatically determined using a machine learning approach based on feedback received from security agent devices.

The distance measure $\Delta_k$ is illustratively computed between markers shared by the given security alert and the other security alert is computed in accordance with the following equation:

$$\Delta_k = f_k(R_1[k], R_2[k])$$

where $\Delta_k$ denotes a distance measure computed as a function $f_k$ between corresponding k-th markers shared by the given security alert and the other security alert, and wherein $R_1[k]$ and $R_2[k]$ denote respective k-th markers in respective relationship sets $R_1$ and $R_2$.

As a more particular example, the distance measure $\Delta_k$ is illustratively computed between markers shared by the given security alert and the other security alert in accordance with the following equation:

$$\Delta_k = \begin{cases} 1, & R_1[k] \neq R_2[k] \\ 0, & R_1[k] = R_2[k] \end{cases}$$

In this example, the distance measure is computed as a step function based on whether or not the k-th marker exists in both relationship sets $R_1$ and $R_2$. Numerous other types of distance functions can be used to compute distance measures in other embodiments. Also, as indicated previously, different types of distance functions can be used to compute distance measures for markers of different types.

The distance measures in the above examples are dynamically computed using information from the marker arrays 107. In combination with the previously-mentioned static weighting of markers in the relevance score equation, a given embodiment can take into account both static and dynamic characteristics in relevance scoring.

Relevance score computations of the type described above are illustratively performed for each of a plurality of different security alerts. Each of the relevance scores relates its corresponding security alert to one or more other security alerts generated prior or subsequent in time to the corresponding security alert.

In step 206, one or more operating characteristics of network security system 105 of the computer network 100 are adjusted based at least in part on the relevance scores. As indicated previously, examples of ways in which operating characteristics of the network security system 105 can be adjusted based on relevance scores include altering visualizations generated by the network security system 105, or generating additional relevance-based security alerts for distribution over the network 104 to the security agent devices 110. Various combinations of these and other different types of adjustments can also be made.

In step 208, communications are sent to security agents associated with respective ones of the security agent devices 110 and one or more automated remedial actions are taken in the network security system 105. Examples of communications that may be sent include the above-noted additional relevance-based security alerts. More particularly, a given communication sent to one of the security agent devices 110 may comprise an indication that a particular received security alert has been determined to bear a high degree of relevance to one or more previous security alerts known to be associated with actual malicious activity within the computer network 100. Examples of automated remedial actions that may be taken include shutting down or otherwise quarantining one or more of the user devices 102.

In step 210, marker weights and distance functions are updated as needed. For example, feedback from the security agent devices 110 may be utilized by the network security system 105 to increase or decrease the weights applied to particular markers based on new information relating to security threats to the computer network 100. Additionally or alternatively, various adjustments or other updates can similarly be made to the distance functions that are utilized in computing distance measures between shared markers.

Figure 2:
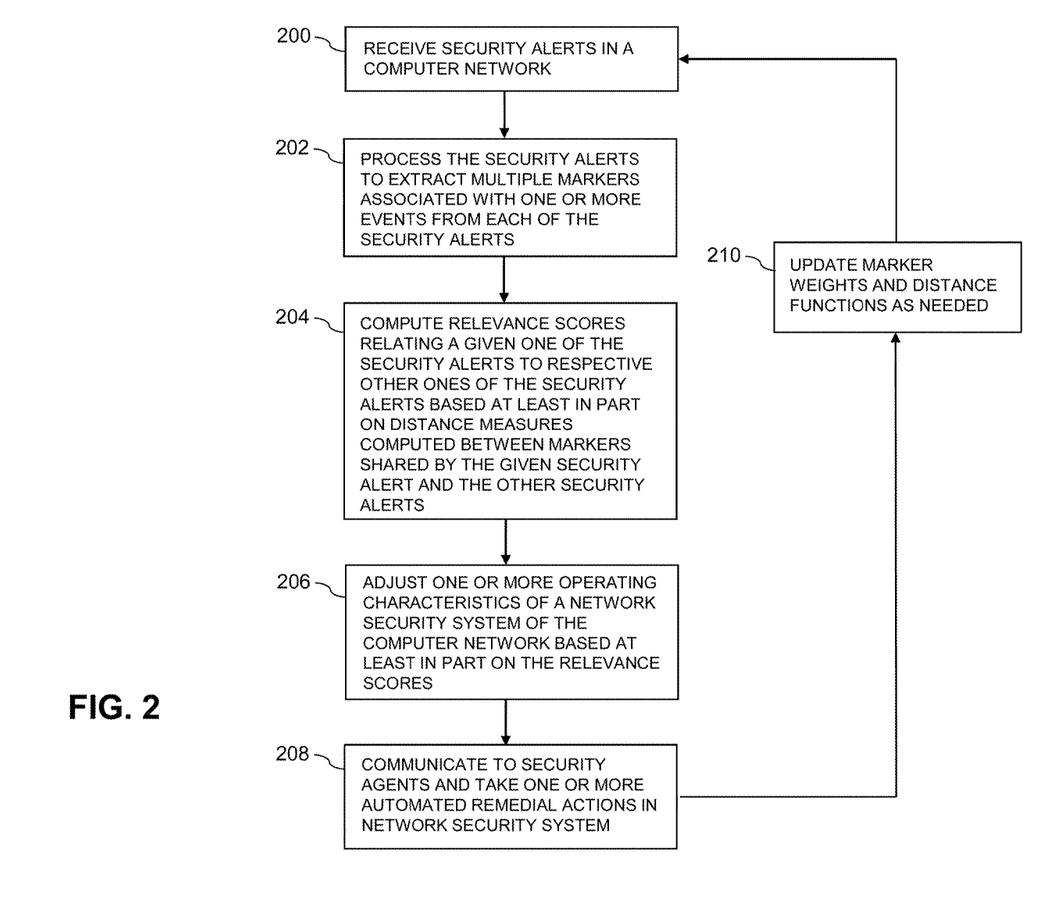
FIG. 2 is a flow diagram of a process for automated determination of relevance of a given security alert to one or more other security alerts based on shared markers in an illustrative embodiment.

The FIG. 2 process can be configured for batch processing of multiple security alerts or for real-time or near-real-time processing of individual security alerts as such alerts are received in the alert receiver 130. Numerous other types of processing modes based on relevance scoring can be supported.

In some embodiments, generating at least one additional security alert relating to one or more of the relevance scores comprises generating multiple additional relevance-based alerts, possibly based on comparisons of the relevance scores to multiple distinct thresholds each triggering a different responsive action. Accordingly, multiple alerts can be generated relative to respective different thresholds in some embodiments.

Additional instances of steps 200 through 210 can be performed for different sets of security alerts or may otherwise be repeated periodically in order to ensure that security alerts that are relevant to one another are properly aggregated for efficient detection and remediation of malicious activity within the computer network 100.

Numerous other techniques can be used in association with automated determination of relevance of a given security alert to one or more other security alerts. For example, alternative processes can be configured to trigger automated remedial actions responsive to relevance scores that are above specified thresholds.

Accordingly, the particular processing operations and other network functionality described in conjunction with the flow diagram of FIG. 2 are presented by way of illustrative example only, and should not be construed as limiting the scope of the invention in any way. Alternative embodiments can use other types of processing operations to determine relevance of a given security alert to one or more other security alerts based on shared markers. For example, the ordering of the process steps may be varied in other embodiments, or certain steps may be performed concurrently with one another rather than serially. Also, as indicated previously, the process steps or subsets thereof may be repeated periodically in conjunction with respective distinct instances of relevance determination for respective security alerts processed within the network security system 105.

Again, the particular marker extraction and relevance scoring arrangements described above are exemplary only, and numerous alternative processing arrangements can be used in other embodiments. Accordingly, the various characteristics of these embodiments are intended to be illustrative only and should not be construed as limiting in any way.

The FIG. 2 process in some embodiments is implemented at least in part utilizing map-reduce processing performed by the processor 120 utilizing memory 122 in the network security system 105.

In a more particular example of an embodiment of this type, the map-reduce processing is configured to compute a plurality of relevance scores relating a given security alert to respective other security alerts. The map-reduce processing includes separate map and reduce functions. The map function of the map-reduce processing illustratively executes on a subset of the security alerts falling within a predefined time range encompassing the given security alert and determines for each of the security alerts in the subset a corresponding maximum match count of markers shared with the given security alert. The reduce function of the map-reduce processing outputs respective identifiers of the security alerts of the subset in association with their respective maximum match counts.

Example pseudocode for implementing a map-reduce processing job of the type described above in the network security system 105 will now be presented. It is assumed that the relevance scores in this embodiment are based on the numbers of shared markers between the given security alert and respective ones of the other security alerts. It further assumed that equal static weights of value one are utilized, and that the distance function utilized for all marker types is the same step function previously described.

As noted above, the map function operates on a subset of security alerts falling within a predefined time range that includes the given security alert, which is particularly specified in a scope of the corresponding map-reduce processing job.

The map function pseudocode is as follows:
for each (alert in subset):
    maximum_match=0;
    match_count=number of markers matched with scope
    if (maximum_match<match_count):
        maximum_match=match_count
    emit (alert_id, maximum_match)

For the given security alert specified in the map function scope, the map function above returns the identifiers of other security alerts and their relevance scores relative to the given security alert.

The reduce function pseudocode in this example simply returns the relevance score generated by the map function and is as follows:
    return maximum_match As indicated above, the scope of the map-reduce processing job identifies the given security alert and includes the marker arrays of that security alert and the other security alerts to which the given security alert is being compared. The output of the map-reduce processing job is illustratively of the following form:

| | |
|---|---|
| Id:AL_01 | value:4 |
| Id:AL_03 | value:3 |
| Id:AL_04 | value:3 |
| Id:AL_05 | value:5 |
| Id:AL_07 | value:6 |

In the above table, the first column indicates security alert identifiers and the second column indicates the corresponding relevance scores relative to the given security alert based on counts of shared markers.

It should be noted that map-reduce processing is not required, and other types of processing can be used to generate relevance scores and implement other related functionality in the network security system 105. For example, alternative types of processing based on aggregation functions may be used.

The above-described illustrative embodiments provide significant advantages relative to conventional approaches.

For example, some embodiments are configured to aggregate multiple potentially otherwise unrelated security alerts using relevance scores that are based at least in part on distance measures computed between shared markers of those security alerts. Such security alert aggregation provides substantially improved visibility for automated threat analytics and other aspects of security threat investigation.

These and other illustrative embodiments can advantageously provide enhanced security against APTs and other types of attacks in enterprise computer networks. For example, these arrangements can facilitate detection of an attack at an early stage of penetration.

Accordingly, security is improved and the probability of detecting a given attack at an early stage is increased. Furthermore, the automated relevance determination and associated security alert aggregation can be implemented in a network security system with no adverse impact on usability and performance of the computer network.

It is to be appreciated that the foregoing advantages are illustrative of advantages provided in certain embodiments, and need not be present in other embodiments.

The computer networks disclosed herein are illustratively implemented using one or more processing platforms, examples of which will be now be described in greater detail. A given such processing platform comprises at least one processing device comprising a processor coupled to a memory.

In some embodiments, portions of a computer network as disclosed herein illustratively comprise cloud infrastructure. The cloud infrastructure in some embodiments comprises a plurality of containers implemented using container host devices. More particularly, the cloud infrastructure in one or more illustrative embodiments comprises container-based virtualization infrastructure configured to implement Docker containers or other types of Linux containers (LXCs).

The cloud infrastructure may additionally or alternatively comprise other types of virtualization infrastructure such as virtual machines implemented using a hypervisor. An example of a commercially available hypervisor platform that may be used to implement portions of the computer network 100 in an illustrative embodiment is the VMware® vSphere® which may have an associated virtual infrastructure management system such as the VMware® vCenter™. The underlying physical machines may comprise one or more distributed processing platforms that include one or more storage systems.

The cloud infrastructure mentioned above may represent at least a portion of one processing platform. Another example of such a processing platform is a plurality of processing devices which communicate with one another over a network. The network may comprise any type of network, including, by way of example, a global computer network such as the Internet, a WAN, a LAN, a satellite network, a telephone or cable network, a cellular network, a wireless network such as a WiFi or WiMAX network, or various portions or combinations of these and other types of networks.

Each processing device of the processing platform comprises a processor coupled to a memory. The processor may comprise a microprocessor, a microcontroller, an ASIC, an FPGA or other type of processing circuitry, as well as portions or combinations of such circuitry elements.

The memory may comprise RAM, ROM or other types of memory, in any combination. The memory and other memories disclosed herein should be viewed as illustrative examples of what are more generally referred to as "processor-readable storage media" storing executable program code of one or more software programs.

As indicated above, articles of manufacture and other computer program products comprising such processor-readable storage media are considered embodiments of the present invention.

Also included in the processing device is network interface circuitry, which is used to interface the processing device with the network and other system components, and may comprise conventional transceivers.

As another processing platform example, portions of a given processing platform in some embodiments can comprise converged infrastructure such as VxRail™, VxRack™ or Vblock® converged infrastructure commercially available from VCE, the Virtual Computing Environment Company, an EMC Federation Company.

The particular processing platforms described above are presented by way of example only, and a given computer network such as computer network 100 may include additional or alternative processing platforms, as well as numerous distinct processing platforms in any combination, with each such platform comprising one or more computers, servers, storage devices or other processing devices.

Processing devices and other computer network components can communicate with one another using a variety of different communication protocols and associated communication media.

It should again be emphasized that the above-described embodiments of the invention are presented for purposes of illustration only. Many variations may be made in the particular arrangements shown. For example, although described in the context of particular network and device configurations, the techniques are applicable to a wide variety of other types of computer networks and processing device configurations. Also, different types and arrangements of network security systems, modules, security alerts, markers, marker arrays, relevance scores, distance functions and other components and parameters can be used in other embodiments. Moreover, the assumptions made herein in the context of describing some illustrative embodiments should not be construed as limitations or requirements of the invention, and need not apply in other embodiments. Numerous other alternative embodiments within the scope of the appended claims will be readily apparent to those skilled in the art.

What is claimed is:

1. A method comprising:
    obtaining a plurality of security alerts in a computer network;
    processing the security alerts to extract a plurality of markers from each of the security alerts;
    computing at least one relevance score relating a given one of the security alerts to another one of the security alerts based at least in part on distance measures computed between markers shared by the given security alert and the other security alert; and
    adjusting at least one operating characteristic of a network security system of the computer network based at least in part on the relevance score;
    wherein the distance measures comprise at least one of:
    a first distance measure computed between markers comprising network addresses of user devices of the computer network, the first distance measure being computed at least in part utilizing a first distance function that measures distance between subnets of the network addresses; and
    a second distance measure computed between markers comprising user identifiers of user devices of the computer network, the second distance measure being computed at least in part utilizing a second distance function that measures distance between associated organizations of the user identifiers;
    wherein an instance of the first distance measure computed between two network addresses belonging to the same subnet is less than an instance of the first distance measure computed between two network addresses not belonging to the same subnet;
    wherein an instance of the second distance measure computed between two user identifiers of respective users in the same organization is less than an instance of the second distance measure computed between two user identifiers of respective users in different organizations; and
    wherein the method is performed by at least one processing device comprising a processor coupled to a memory.

2. The method of claim 1 wherein obtaining a plurality of security alerts in the computer network further comprises receiving at least a subset of the security alerts in the network security system from one or more user devices of the computer network.

3. The method of claim 1 wherein adjusting at least one operating characteristic of the network security system further comprises altering a visualization generated by the network security system to provide an indication of a threshold level of relevance between the given security alert and the other security alert.

4. The method of claim 1 wherein processing the security alerts to extract a plurality of markers from each of the security alerts further comprises:
    identifying at least one relationship set of markers having a specified relationship for one or more events of the security alert being processed;
    forming a marker array comprising the relationship set of markers having the specified relationship for the one or more events; and
    storing the marker array for the security alert in a security alert database associated with the network security system.

5. The method of claim 4 wherein the one or more events of the security alert comprise respective occurrences of at least one of an activity and a change of state relating to at least one user device of the computer network.

6. The method of claim 1 wherein computing at least one relevance score relating a given one of the security alerts to another one of the security alerts further comprises:
    generating a plurality of relevance scores each relating the given security alert to a different one of a plurality of other ones of the security alerts;
    wherein a first one of the relevance scores relates the given security alert to another security alert that was generated prior in time to the given security alert;
    wherein a second one of the relevance scores relates the given security alert to another security alert that was generated subsequent in time to the given security alert.

7. The method of claim 1 wherein the markers comprise one or more of a user identifier, a source IP address, a source domain, a destination IP address and a destination domain.

8. The method of claim 1 wherein computing at least one relevance score comprises computing the relevance score as a function of a number of markers shared by the given security alert and the other security alert such that the relevance score increases with an increasing number of markers shared by the given security alert and the other security alert.

9. The method of claim 1 wherein computing at least one relevance score comprises computing the relevance score in accordance with the following equation:

$$Rel = \sum_{k=0}^{n} \omega_k \cdot (1 - \Delta_k)$$

where Rel denotes the relevance score, $\omega_k$ denotes a weight coefficient for a k-th marker of a relationship set, $\Delta_k$ denotes a distance measure computed between corresponding k-th markers shared by the given security alert and the other security alert, and n denotes a total number of markers in the relationship set that includes the k-th marker.

10. The method of claim 1 wherein a given one of the distance measures computed between markers shared by the given security alert and the other security alert is computed in accordance with the following equation:

$$\Delta_k = f_k(R_1[k], R_2[k])$$

where $\Delta_k$ denotes a distance measure computed as a function $f_k$ between corresponding k-th markers shared by the given security alert and the other security alert, and wherein $R_1[k]$ and $R_2[k]$ denote respective k-th markers in respective relationship sets $R_1$ and $R_2$.

11. The method of claim 10 wherein a given one of the distance measures computed between markers shared by the given security alert and the other security alert is computed in accordance with the following equation:

$$\Delta_k = \begin{cases} 1, & R_1[k] \neq R_2[k] \\ 0, & R_1[k] = R_2[k] \end{cases}$$

the given distance measure thereby being computed as a step function based on whether or not the k-th marker exists in both relationship sets $R_1$ and $R_2$.

12. The method of claim 1 wherein different functions are utilized to compute distance measures between markers of different types.

13. The method of claim 1 wherein computing at least one relevance score relating a given one of the security alerts to another one of the security alerts further comprises:
   implementing map-reduce processing to compute a plurality of relevance scores relating the given security alert to respective other security alerts;
   wherein a map function of the map-reduce processing executes on a subset of the security alerts falling within a predefined time range encompassing the given security alert and determines for each of the security alerts in the subset a corresponding maximum_match_count of markers shared with the given security alert; and
   wherein a reduce function of the map-reduce processing outputs respective identifiers of the security alerts of the subset in association with their respective maximum_match counts.

14. A computer program product comprising a non-transitory processor-readable storage medium having stored therein program code of one or more software programs, wherein the program code when executed by at least one processing device causes said at least one processing device:
   to obtain a plurality of security alerts in a computer network;
   to process the security alerts to extract a plurality of markers from each of the security alerts;
   to compute at least one relevance score relating a given one of the security alerts to another one of the security alerts based at least in part on distance measures computed between markers shared by the given security alert and the other security alert; and
   to adjust at least one operating characteristic of a network security system of the computer network based at least in part on the relevance score;

wherein the distance measures comprise at least one of:
   a first distance measure computed between markers comprising network addresses of user devices of the computer network, the first distance measure being computed at least in part utilizing a first distance function that measures distance between subnets of the network addresses; and
   a second distance measure computed between markers comprising user identifiers of user devices of the computer network, the second distance measure being computed at least in part utilizing a second distance function that measures distance between associated organizations of the user identifiers;
wherein an instance of the first distance measure computed between two network addresses belonging to the same subnet is less than an instance of the first distance measure computed between two network addresses not belonging to the same subnet; and
wherein an instance of the second distance measure computed between two user identifiers of respective users in the same organization is less than an instance of the second distance measure computed between two user identifiers of respective users in different organizations.

15. The computer program product of claim 14 wherein the program code when executed by said at least one processing device causes said at least one processing device:
   to generate a plurality of relevance scores each relating the given security alert to a different one of a plurality of other ones of the security alerts;
   wherein a first one of the relevance scores relates the given security alert to another security alert that was generated prior in time to the given security alert; and
   wherein a second one of the relevance scores relates the given security alert to another security alert that was generated subsequent in time to the given security alert.

16. The computer program product of claim 14 wherein the program code when executed by said at least one processing device causes said at least one processing device:
   to implement map-reduce processing to compute a plurality of relevance scores relating the given security alert to respective other security alerts;
   wherein a map function of the map-reduce processing executes on a subset of the security alerts falling within a predefined time range encompassing the given security alert and determines for each of the security alerts in the subset a corresponding maximum_match_count of markers shared with the given security alert; and
   wherein a reduce function of the map-reduce processing outputs respective identifiers of the security alerts of the subset in association with their respective maximum_match counts.

17. An apparatus comprising:
   at least one processing device comprising a processor coupled to a memory;
   said at least one processing device being configured:
   to obtain a plurality of security alerts in a computer network;
   to process the security alerts to extract a plurality of markers from each of the security alerts;
   to compute at least one relevance score relating a given one of the security alerts to another one of the security alerts based at least in part on distance measures computed between markers shared by the given security alert and the other security alert; and to adjust at least one operating characteristic of a network security system of the computer network based at least in part on the relevance score;

wherein the distance measures comprise at least one of:
- a first distance measure computed between markers comprising network addresses of user devices of the computer network, the first distance measure being computed at least in part utilizing a first distance function that measures distance between subnets of the network addresses; and
- a second distance measure computed between markers comprising user identifiers of user devices of the computer network, the second distance measure being computed at least in part utilizing a second distance function that measures distance between associated organizations of the user identifiers;

wherein an instance of the first distance measure computed between two network addresses belonging to the same subnet is less than an instance of the first distance measure computed between two network addresses not belonging to the same subnet; and an instance of the second distance measure computed between two user identifiers of respective users in the same organization is less than an instance of the second distance measure computed between two user identifiers of respective users in different organizations.

18. The apparatus of claim 17 wherein said at least one processing device is further configured:

to generate a plurality of relevance scores each relating the given security alert to a different one of a plurality of other ones of the security alerts;

wherein a first one of the relevance scores relates the given security alert to another security alert that was generated prior in time to the given security alert; and wherein a second one of the relevance scores relates the given security alert to another security alert that was generated subsequent in time to the given security alert.

19. The apparatus of claim 17 wherein said at least one processing device is further configured:

to implement map-reduce processing to compute a plurality of relevance scores relating the given security alert to respective other security alerts;

wherein a map function of the map-reduce processing executes on a subset of the security alerts falling within a predefined time range encompassing the given security alert and determines for each of the security alerts in the subset a corresponding maximum_match_count of markers shared with the given security alert; and wherein a reduce function of the map-reduce processing outputs respective identifiers of the security alerts of the subset in association with their respective maximum_match counts.

20. The apparatus of claim 17 wherein different functions are utilized to compute distance measures between markers of different types.

* * * * *